US007206758B2

(12) United States Patent
Kuehr-McLaren et al.

(10) Patent No.: US 7,206,758 B2
(45) Date of Patent: Apr. 17, 2007

(54) METHOD, SYSTEM AND COMPUTER PROGRAM PRODUCT FOR IDENTIFYING AND IMPLEMENTING COLLECTED PRIVACY POLICIES AS AGGREGATE PRIVACY POLICIES IN ELECTRONIC TRANSACTIONS

(75) Inventors: David G. Kuehr-McLaren, Apex, NC (US); Martin Presler-Marshall, Chapel Hill, NC (US); Calvin S. Powers, Chapel Hill, NC (US); Timothy Shoriak, Cary, NC (US); John H. Walczyk, III, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 10/706,465

(22) Filed: Nov. 12, 2003

(65) Prior Publication Data
US 2005/0102195 A1 May 12, 2005

(51) Int. Cl.
*G06Q 30/00* (2006.01)
(52) U.S. Cl. .......................................... 705/26; 705/80
(58) Field of Classification Search ................. 705/26, 705/80
See application file for complete search history.

(56) References Cited

U.S. PATENT DOCUMENTS

| 5,745,574 | A | 4/1998 | Muftic | 380/23 |
|---|---|---|---|---|
| 5,987,440 | A | 11/1999 | O'Neil et al. | 705/44 |
| 6,343,274 | B1* | 1/2002 | McCollom et al. | 705/26 |
| 6,604,089 | B1* | 8/2003 | Van Horn et al. | 705/26 |
| 2002/0029201 | A1* | 3/2002 | Barzilai et al. | 705/80 |
| 2003/0023451 | A1* | 1/2003 | Willner et al. | 705/1 |
| 2003/0088520 | A1* | 5/2003 | Bohrer et al. | 705/74 |
| 2004/0054918 | A1* | 3/2004 | Duri et al. | 713/200 |
| 2004/0111302 | A1* | 6/2004 | Falk et al. | 705/4 |
| 2004/0111423 | A1* | 6/2004 | Irving et al. | 707/100 |
| 2004/0117322 | A1* | 6/2004 | Bjorksten et al. | 705/80 |
| 2004/0122696 | A1* | 6/2004 | Beringer | 705/1 |
| 2005/0091101 | A1* | 4/2005 | Epling et al. | 705/10 |
| 2005/0102155 | A1* | 5/2005 | Kuehr-McLaren et al. | 705/1 |
| 2005/0102194 | A1* | 5/2005 | Kuehr-McLaren et al. | 705/26 |
| 2006/0247982 | A1* | 11/2006 | Stolfo et al. | 705/26 |

FOREIGN PATENT DOCUMENTS

EP 0605106 A1 7/1994

(Continued)

OTHER PUBLICATIONS

Anon., "Interaction between Different Standards," Computer Audit Update, Jan. 1994.*

(Continued)

*Primary Examiner*—Nicholas D. Rosen
(74) *Attorney, Agent, or Firm*—Synnestvedt & Lechner LLP

(57) ABSTRACT

Parties involved in transacting business in an E-marketplace (E-marketplace participants) each identify and submit to the E-marketplace relevant characteristics related to their privacy policy needs. When it is determined that two or more participants are collaborating in a transaction (e.g., a supplier and a shipper; two suppliers; three buyers), the privacy policies of the collaborative group are aggregated to produce a single policy that represents the primary policies of the collaborative transaction being presented by the collaborative group.

16 Claims, 8 Drawing Sheets

FOREIGN PATENT DOCUMENTS

| | | | |
|---|---|---|---|
| EP | 1118925 A1 | * | 7/2001 |
| WO | WO 99/52242 | | 10/1999 |
| WO | WO 99/66428 | | 12/1999 |
| WO | WO 00/28452 | | 5/2000 |
| WO | WO 00/29973 | | 5/2000 |
| WO | WO-02080042 A1 | * | 10/2002 |

OTHER PUBLICATIONS

Anon., "Click Me up, MarketMAX," Retail Merchandiser, vol. 40, No. 5, p. 106, May 2000.*

Jones, J., "Vendors Huddle over Privacy," Network World, Jun. 19, 2000.*

Jones, J., "Vendors Tout Privacy Spec.," InfoWorld, vol. 22, No. 26, p. 12, Jun. 26, 2000.*

Enterlin, M.G., "Are Your Suppliers Security Conscious?" Security Management, vol. 34, No. 8, p. 110, Aug. 2001.*

Weber, T.E., "A New Privacy Tool Is at Your Disposal Now—Warts and All," Wall Street Journal, Eastern Edition, New York, p. B1, Sep. 10, 2001.*

Swindells & Henderson, "Legal regulation of electornic commerce," Journal of Information Law & Technology, No. 3 (1998) [Inspec Abstract Only].

Gerhard & Rohm, "A secure electronic market for anonymous transferable emission permits," Proceedings of the 31st Hawaii Intl. Conference on System Sciences (Cat. No. 98TB100216), Pt. vol. 4, pp. 232-241, Los Alamitos, CA (1998) [Inspec Abstract Only].

* cited by examiner

Buyer Privacy Preferences

Can E-Marketplace Participants     ☐ Yes
Sell Your Email Address?     ☒ No
    ☐ Don't Care Can E-Marketplace Participants     ☐ Yes
Send You Seller-Originated     ☒ No
Advertising?     ☐ Don't Care Can E-Marketplace Participants     ☐ Yes
Share Your Demographic Data     ☒ No
With Others?     ☐ Don't Care

Figure 3

Seller 02 Privacy Policies

Will You Sell the Email Address of E-Marketplace Participants?  ☒ Yes  ☐ No

Will You Send Seller-Originated Advertising to E-Marketplace Participants?  ☒ Yes  ☐ No Will You Share Demographic Data of E-Marketplace Participants With Others?  ☐ Yes  ☒ No

Figure 5

Seller 03 Privacy Policies

Will You Sell the Email Address ☒ Yes
of E-Marketplace Participants? ☐ No

Will You Send Seller-Originated ☒ Yes
Advertising to E-Marketplace ☐ No
Participants?

Will You Share Demographic Data of ☒ Yes
E-Marketplace Participants ☐ No
With Others?

Figure 6

Offers Available for Buyer

| Offer | Sell Email Address? | Send Seller-Originated Advertising? | Share Demographic Data With Others? | Product | Price per Unit |
|---|---|---|---|---|---|
| Offer 01 | NO | NO | NO | Widget A | $10 |
| Offer 02 | YES | YES | NO | Widget A | $8 |
| Offer 03 | YES | YES | YES | Widget A | $7 |
| Offer 04 | NO | NO | NO | Widget A | $11 |
| Offer 05 | NO | YES | NO | Widget A | $11 |
| Offer 06 | YES | NO | NO | Widget A | $11 |
| Offer 07 | YES | YES | YES | Widget A | $8 |
| Offer 08 | NO | NO | NO | Widget A | $11 |
| Offer 09 | YES | YES | YES | Widget A | $8 |
| Offer 10 | NO | NO | NO | Widget A | $11 |
| Offer 11 | NO | NO | NO | Widget A | $12 |
| Offer 12 | YES | YES | NO | Widget A | $9 |
| Offer 13 | YES | YES | NO | Widget A | $9 |

Figure 7

Offers Available for Buyer

| Offer | Sell Email Address? | Send Seller-Originated Advertising? | Share Demographic Data With Others? | Product | Price per Unit |
|---|---|---|---|---|---|
| Offer 01 | NO | NO | NO | Widget A | $10 |
| Offer 04 | NO | NO | NO | Widget A | $11 |
| Offer 08 | NO | NO | NO | Widget A | $11 |
| Offer 10 | NO | NO | NO | Widget A | $11 |
| Offer 11 | NO | NO | NO | Widget A | $12 |

Figure 8

METHOD, SYSTEM AND COMPUTER PROGRAM PRODUCT FOR IDENTIFYING AND IMPLEMENTING COLLECTED PRIVACY POLICIES AS AGGREGATE PRIVACY POLICIES IN ELECTRONIC TRANSACTIONS

BACKGROUND OF THE INVENTION

1. Field of the Invention

The present invention relates to the use of privacy policies in computer-based on-line commerce in which sellers and buyers of goods or services are linked via an electronic marketplace where deals are negotiated and consummated.

2. Description of the Related Art

As networks of linked computers become an increasingly more prevalent concept in everyday life, on-line interactions between buyers and sellers have become commonplace. Transactions between a business and an individual consumer are referred to as business-to-consumer (B2C) transactions and transactions between businesses (e.g., the sale of goods from a manufacturer to a wholesaler who uses the purchased goods to eventually sell a product on the retail level) are referred to as business-to-business (B2B) transactions.

As a result of this increased use of networked computers to transact business, the concept of the electronic marketplace, referred to herein as the "E-marketplace," has emerged and become a standard form of conducting these business transactions. For a variety of reasons, the intermediary function provided by the E-marketplace is now an everyday part of transactional commerce.

On the consumer end, E-commerce sites such as E-Bay, half.com, Ubid.com, and AuctionPort.com provide an E-marketplace serving as a central location for negotiation of sales and/or auctions of products or services from a seller to a consumer (e.g., bidders). Likewise, B2B sellers provide a similar intermediary service for business transactions between businesses.

A significant trade off for enjoying the convenience of e-commerce is the need to submit to a semi-public forum what would typically be considered private information. For example, to do business on an e-commerce site, it is usually necessary to provide any or all of the following: name, address, telephone number, email address, credit card numbers, demographic information and the like. For B2B, this information might include banking information, pricing information, inventory information, and personal information pertaining to company contacts. This quite naturally concerns users of e-commerce since once submitted to the e-commerce site, the user loses control of the use of the information by others. This invariably stops some users from utilizing e-commerce sites to make purchases, despite the convenience that they offer.

As a result of the above problems, steps have been taken to develop methods for protecting the privacy of e-commerce users while allowing the e-commerce sites to function. As an example, the Platform for Privacy Preferences Project (P3P) was developed by the World Wide Web Consortium and has emerged as an industry standard providing a simple, automated way for users to gain more control over the use of personal information on websites that they visit. P3P is a standardized set of multiple-choice questions, covering all the major aspects of a website's privacy policies. Taken together, they present a clear snapshot of how a site handles personal information about its users. P3P-enabled websites make this information available in a standard, machine-readable format. P3P-enabled browsers can "read" this snapshot automatically and compare it to the consumer's own set of privacy preferences. P3P enhances a user's control by putting privacy policies where users can find them, in a form users can understand, and most importantly, enables users to act on what they see.

While functioning adequately, use of P3P or other systems to specify privacy information in an E-marketplace can be quite cumbersome. A declaration of a privacy policy that characterizes an entire particular marketplace is difficult to identify and to express. An E-marketplace administrator can require all participants to adhere to one particular privacy policy, either overall or even on a section-by-section basis of the marketplace (e.g., all electronics vendors adhere to one privacy policy, all service providers adhere to another privacy policy, etc.), but requiring this adherence will limit the number of willing seller participants. Similarly, the marketplace could invoke and display to participants a privacy statement that applies to the portal itself, but not to the individual participants, available via the portal. This would likely limit the number of potential buyers using the portal, since there would be no guarantee that the portal participants would respect the buyers' privacy needs. The use of this information will depend on the individual privacy policy of the parties involved in the transaction, and at each juncture in the transaction, the consumer's set of privacy preferences will have to be compared with those of each party to the transaction, an annoying and time-consuming process.

Another difficulty arises if a business exchange involves a collaboration of vendors or buyers, e.g., where several vendors collaborate to fulfill a buyer's request that the vendors could not fulfill individually, or where several buyers collaborate to purchase large quantities so as to achieve a bulk discount.

SUMMARY OF THE INVENTION

In accordance with the present invention, parties involved in transacting business in an E-marketplace (E-marketplace participants) each identify and submit to the E-marketplace relevant characteristics related to their privacy policy needs (those that they adhere to, referred to as "privacy policies"; those that they require, referred to as "privacy preferences", or both). Typically, this would occur during the registration process when an E-marketplace participant first registers with the E-marketplace, but could be defined per transaction. When it is determined that two or more participants are collaborating in a transaction (e.g., a supplier and a shipper; two suppliers; three buyers), the privacy policies of the collaborative group are aggregated-to produce a single policy that represents the primary policies of the collaborative group.

BRIEF DESCRIPTION OF THE DRAWINGS

FIG. 3 is a simulated screen capture illustrating a simplified example of questions posed to (and responses of) a hypothetical participant (Buyer 01) in accordance with the present invention in an E-marketplace environment;

FIG. 5 is a simulated screen capture illustrating a simplified example of questions posed to (and responses of) a similar hypothetical participant (Seller 02) in accordance with the present invention in an E-marketplace environment;

FIG. 6 is a simulated screen capture illustrating a simplified example of questions posed to (and responses of) a similar hypothetical participant (Seller 03) in accordance with the present invention in an E-marketplace environment;

FIG. 7 is a simulated screen capture of a GUI showing a listing of potential offers for Buyer 01; and FIG. 8 illustrates a filtering function applied to the potential offers for Buyer 01 illustrated in FIG. 6.

DETAILED DESCRIPTION OF THE PREFERRED EMBODIMENTS

In accordance with the present invention, parties utilizing an E-marketplace (e.g., buyers, sellers, and support parties such as insurers, deliverers, etc.) provide privacy-use information, (i.e., privacy policy and/or privacy preferences), as part of a registration process for the E-marketplace as an automated process. As an administrative task of the E-marketplace, or as an automated process, these privacy-policy requirements are gathered, reviewed, and categorized, so that they can be used to allow display of and selection of participants from a particular category that meets the desires of the participant.

Figure 1:
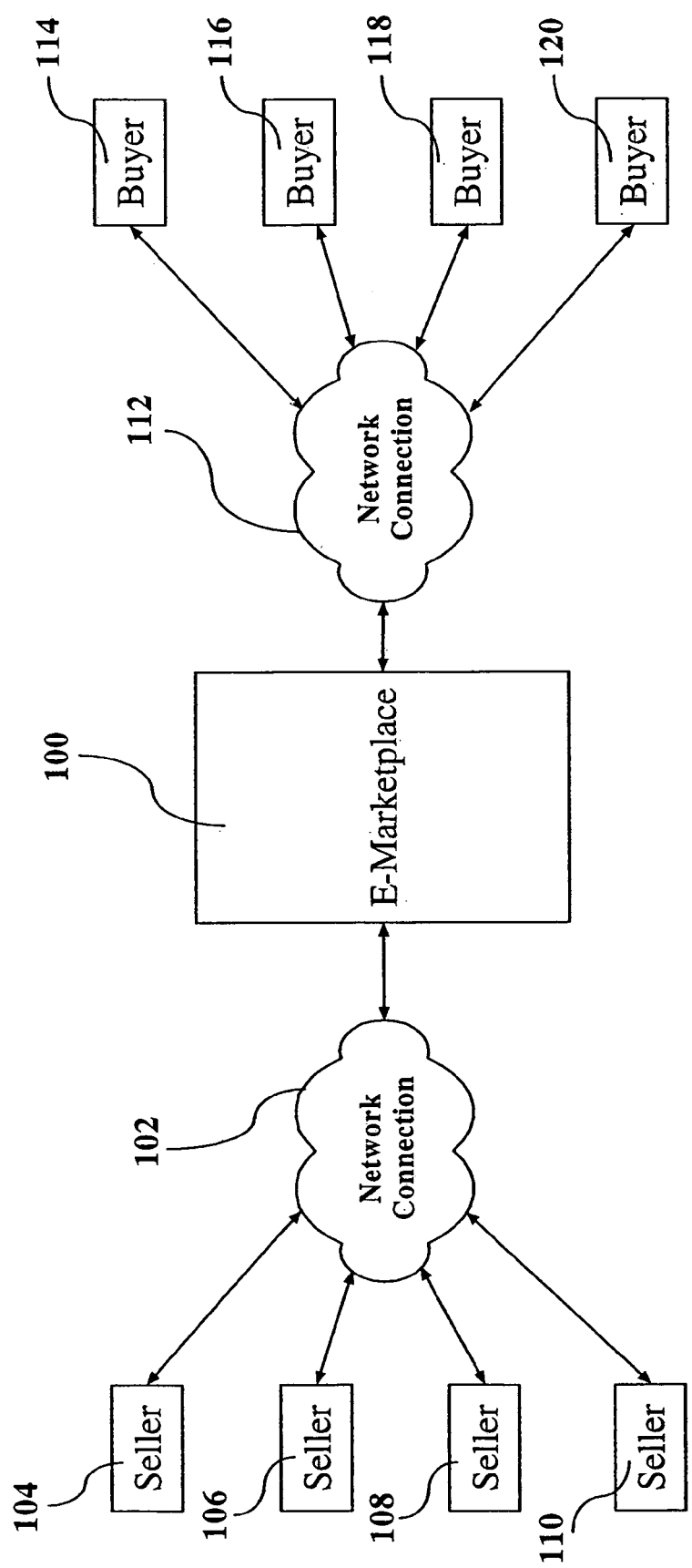
FIG. 1 illustrates a typical E-marketplace environment in which the present invention can be practiced.

FIG. 1 illustrates a typical E-marketplace environment in which the present invention can be practiced. An E-marketplace 100 is coupled to a plurality of sellers 104, 106, 108 and 110 via a network connection 102 (e.g., the Internet). Similarly, E-marketplace 100 is connected to a plurality of buyers 114, 116, 118, and 120 via a network connection 112. Typically, the E-marketplace 100 will comprise a server configured to receive communications from the network connections 102, 112, store information for viewing by parties connected to the network connections 102 and 112, and store other information pertaining to transactions which may occur in the E-marketplace. Sellers 104, 106, 108, and 110, and buyers 114, 116, 118, and 120, typically use PC workstations, PDA's, networks, wireless devices, or other network communication devices for accessing the E-marketplace via the network connections 102 and 112.

In a typical electronic transaction using the environment illustrated in FIG. 1, a seller, e.g., seller 104, will connect to E-marketplace 100 via the network connection 102 and register with the E-marketplace. Seller 104 may identify itself by a pseudonym and typically will be required to also provide true name, address, e-mail address and other identity information for identification purposes.

In accordance with the present invention, if seller 104 is an individual (or is not a web-based business) seller 104 also provides privacy-use information (e.g., as part of an HTTP request or in an attribute certificate) as part of the registration process. This privacy-use information is used by potential purchasers to evaluate purchases, as well as by the E-marketplace to attract potential purchasers. If seller 104 is a business, then as part of the registration process, it provides its P3P policy, or other similar privacy information (or its location on the seller's server) to the E-marketplace.

This privacy-use information may include the seller's policy regarding sale of email lists, use of sales information, protection of credit card numbers and other personal information, demographic information and the like. The privacy-policy information submitted by the seller 104 describes privacy attributes related to the seller.

The same type of information can be provided to the E-marketplace by potential buyers. For example, buyer 114 provides an attribute certificate to E-marketplace 100 via network connection 112 as part of the registration process. The attribute certificate from the buyer includes privacy-use information pertaining to them, including for example, their decisions regarding use of private information such as email address, name and address information, credit card information and any other personal or business-related information that could be considered private. For example, the buyer 114 might not mind that the E-marketplace uses demographic information for marketing and other purposes, but does not want its email address sold. This kind of information would be included in the attribute certificate (or an HTTP request) sent during the registration process, or per transaction.

The E-marketplace administrator (or administration software that automatically operates on the E-marketplace server) receives and stores all of the privacy-policy information from the participants. Next, sellers submit offers and buyers submit requests so that sellers and buyers with mutual interests can locate each other.

Many offers from sellers or requests from buyers may be presented by multiple parties, rather than simply a single seller and/or single buyer. For example, a seller may collaborate with a shipping company to present a combined offer of widgets at a particular price and delivery according to certain terms. Similarly, two sellers of compatible items might combine to sell the two items together (e.g., CD players and headphones). In addition, multiple buyers may wish to get together to try to purchase large quantities of an item that they later divide for their own use. Each of these collaborations is referred to herein as a "collaborative group", and the transaction they present to the E-marketplace is referred to herein as a "collaborative transaction". A "non-collaborative" transaction is one presented to the E-marketplace by an individual or single organization.

As discussed above, these collaborative groups are made up of individuals who may have differing privacy policies. When a collaborative group submits an offer, or makes a purchase request to the marketplace, in accordance with the present invention, the E-marketplace administrator (or administration software) performs an aggregation process whereby the privacy policies of the individuals forming a collaborative group are aggregated so that participants attempting to do business with the collaborative group can be made aware of the overall privacy policy of the collaborative group. For example, if one of the members of the collaborative group will sell email addresses, while the other will not, the aggregation process will take, as the aggregate policy, the policy that offers the least amount of privacy to the buyer who will transact business with this collaborative group, in this example, the collaborative group will be listed as a group that "may sell email addresses". This aggregation process is carried out for each of the privacy policy elements so that a user attempting to do business with the collaborative group will know the "worst case scenario" regarding use of its privacy information.

In a similar manner, a collaborative group that is getting together to purchase on the E-marketplace will have aggregate preferences compiled so that it will be clear to sellers how restrictive (or unrestrictive) the privacy concerns of the collaborative group making the purchase requires.

Thus, when looking at a list of sellers in the marketplace, buyers can look for collaborative groups or individuals that meet their requirements, and sellers can look for potential purchasers who have requirements that the seller can meet.

In an alternative embodiment, the aggregation concept of the present invention is combined with a filtering aspect so that buyers will only be shown sellers or collaborative selling groups that meet their requirements.

Thus, a participant who has no interest in dealing with a seller or collaborative selling group who may sell its email address will not be shown offers from collaborative selling groups that have an aggregate privacy policy that indicates one or more participants in the offer will sell email addresses. Likewise, if a seller, as part of an offer, has no interest in selling to consumers or collaborative purchasing groups who do not want their email address sold, they too will be filtered out so that the seller will only see as available consumers those who have indicated that they do not mind that their email address be sold.

Figure 2:
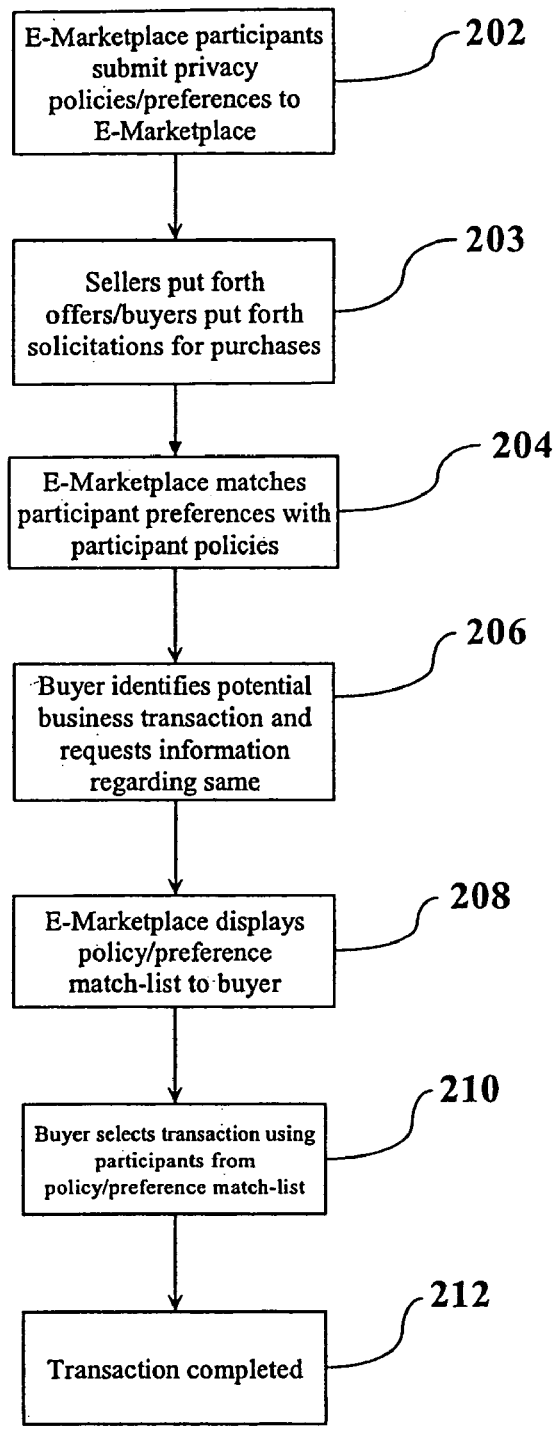
FIG. 2 is a flowchart illustrating an example of basic steps performed in accordance with the present invention.

FIG. 2 is a flowchart illustrating an example of the basic steps performed in accordance with the present invention. At step 202, an E-marketplace participant submits its privacy-use information (e.g., policies and/or preferences) to the E-marketplace. This may involve completion of a form provided by the E-marketplace that solicits specific privacy-use information regarding the participant, or the submission of an attribute certificate, or the identification of an address or a web-server where a P3P policy (or other policy information) resides.

At step 203, sellers put forth offers to the marketplace, and buyers put forth solicitations for purchases that they wish to make. Collaborative selling groups are identified to the marketplace, since the collaborative sale is not offered by one individual seller. Likewise, collaborative buying groups are put forth to the marketplace as a single collaborative group.

At step 204, the E-marketplace aggregates the preferences/policies for all collaborative groups in accordance with the aggregation rules being used. By default, the rules give preference to privacy protection, although if desired, privacy categories could instead be established if appropriate rules are established. For example, preferences/policies indicating no allowance for use of any privacy information could be categorized in a "high privacy" level; similarly, preferences/policies indicating allowance for use of all privacy information could be categorized at a "Low Privacy" level. Other degrees between "high privacy" and "Low Privacy" could also be established. Obviously, categories of any kind can be established, including categories unrelated to privacy in any way, e.g., by company size, age of company, employment of participant, etc.

Once the aggregate privacy policies of any collaborative groups have been established, the participants are then given access to the various offers, which are identified by their privacy policies. Privacy policies for collaborative groups are identified by their aggregate privacy policy only; this prevents participants from knowing if they are dealing with an individual or a collaborative group. The identification can be done in any known manner, e.g., by actually listing the privacy policy values next to the participant name, or by assigning a code to each category and designating each participant with the appropriate code, or by grouping the participants under headings appropriate to their category. In a preferred embodiment, the category assignments can be used to filter out those participants that do not meet the privacy (in this example) needs of another participant.

At step 206, a buyer accesses the E-marketplace via the network connection and identifies a particular desired purchase or potential business transaction of interest (e.g., the user indicates that they wish to purchase 15 refurbished Thinkpad computers) and requests a list of offers that meet their needs. This can comprise the simple action of clicking on an icon identifying the transaction, or any other known means of selecting information from an E-marketplace.

At step 208, the E-marketplace displays a list to the buyer of, in one embodiment, all offers involving participants that can provide the purchase need or transaction need, with their aggregate privacy category displayed. This gives the participants the ability to select any of the offers, and know in advance what level of privacy the potential business partner(s) provide.

In another embodiment, only those offers that fall within their privacy preferences and which can provide the product or service identified by the Buyer at step 206 are displayed. This match-list is a list of all E-market participants able to fulfill the purchase interests of the Buyer that are within their privacy preference requirements. Accordingly, potential offers that, but for their privacy policy categorization would be considered as potential offers by the buyer, are not shown to the Buyer as an option.

At step 210, the buyer selects a transaction using one or more offers listed. At this point, the transaction commences in accordance with a normal E-commerce transaction within this E-marketplace and at step 212 the transaction is completed.

The following example illustrates an example of the use of the present invention in an E-Marketplace environment, and shows simulated screen captures (FIGS. 3–6) from a graphical user interface (GUI), illustrating how the present invention might be implemented for use in such an environment. In the example of FIG. 3, a user of the E-Marketplace (a buyer in this example) is shown a "Buyer Preferences" window when registering with the E-Marketplace. As can be seen in FIG. 3, which is an extremely simplified example used only for the purpose of explanation, the buyer is required to answer a series of questions (three in this example) which will solicit from the buyer his or her preferences regarding use of privacy data. Thus, as shown in FIG. 3, the buyer is asked the following questions:

1. Can E-Marketplace Participants Sell Your Email Address?
2. Can E-Marketplace Participants Send You Advertising That They Originate?
3. Can E-Marketplace Participants Share Your Demographic Data With Others?

and are given the opportunity to answer (by checking a box) with either "Yes", "No", or "Don't Care". In the example illustrated in FIG. 3, the Buyer has answered "No" to the sale of email question; "No" to the receipt of seller-originated advertising; and "No" to the sharing of demographic data question.

Figure 4:
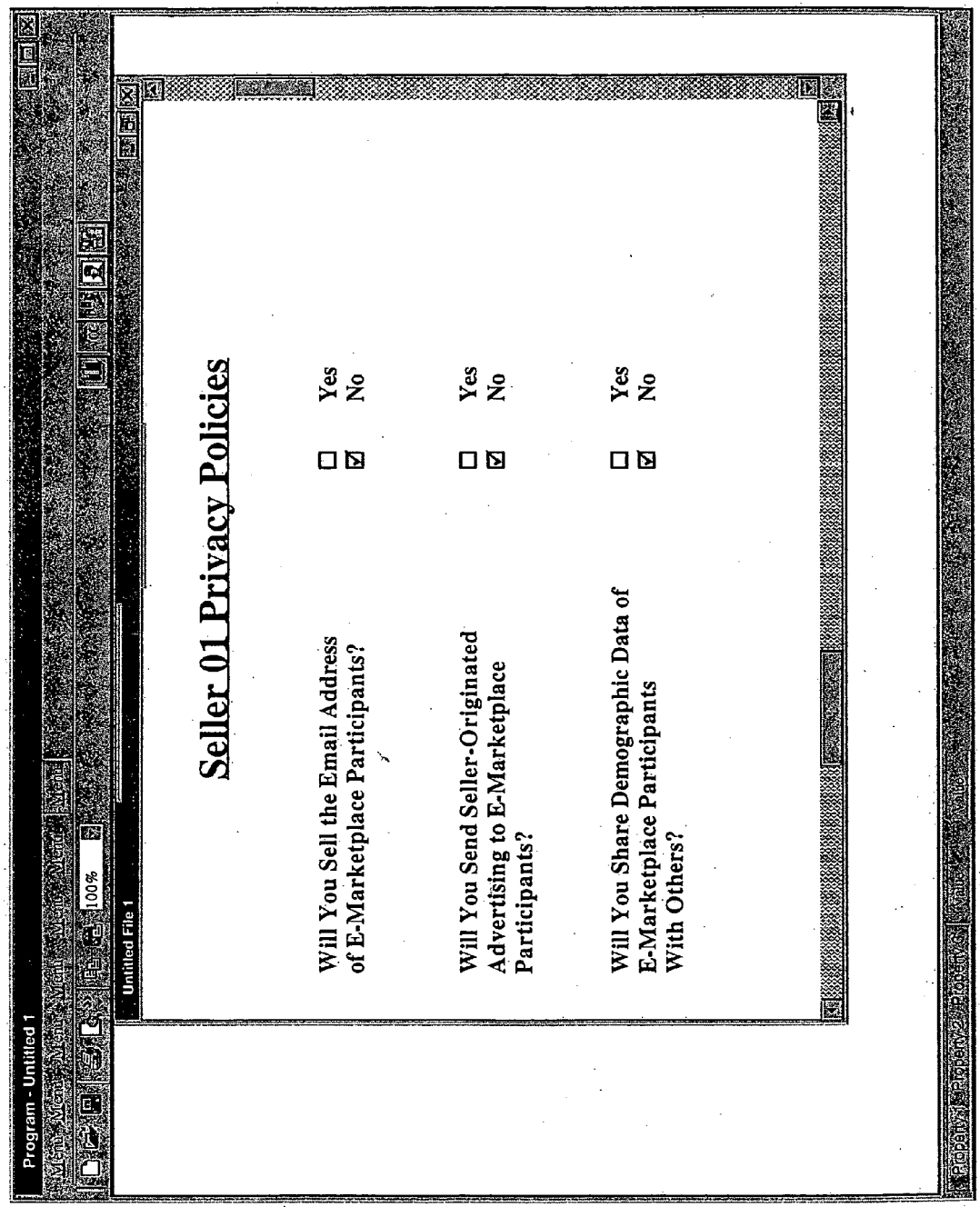
FIG. 4 is a simulated screen capture illustrating a simplified example of questions posed to (and responses of) a hypothetical participant (Seller 01) in accordance with the present invention in an E-marketplace environment.

FIG. 4 illustrates a GUI display of a similarly simplified set of questions posed to "providers" (e.g., sellers, shippers, insurers, etc) in the E-Marketplace ("Seller 01" in this example). The questions posed to Seller 01 are directed to its privacy policies under which they operate. As can be seen, the questions correspond to those asked of the buyer in FIG. 3, that is, Seller 01 provides information regarding whether or not they sell email addresses; send advertising to E-marketplace participants; and share demographic data of participants with others. In this example, Seller 01 has indicated it will not sell email addresses; that they will not send seller-originated advertising to participants; and that they will not share demographic data of participants with others.

FIG. 5 illustrates the same questions to another seller (Seller 02). As can be seen, Seller 02 will sell email addresses to E-marketplace participants; will send seller-originated advertising; and will not share demographic data of participants with others.

FIG. 6 illustrates the same questions posed to another seller (Seller 03). As can be seen, Seller 03 will sell email addresses to E-marketplace participants; will send seller-originated advertising; and will share demographic data of participants with others.

For each provider in the E-marketplace, the same questions are posed and their responses recorded and compiled. For purposes of example, only three representative GUI displays are shown (FIG. 4 for Seller 01; FIG. 5 for Seller 02; and FIG. 6 for Seller 03); however, it is understood that there will typically be many providers in the E-marketplace and this information will be solicited for each provider. When multiple participants combine to make or accept an offer, the privacy policies of the combined participants in the offer are aggregated to enable the offer to be characterized in view of the aggregated policies.

FIG. 7 illustrates a simulated screen capture of a GUI screen showing a listing of potential offers (Offers 01 through 13 in this example) for the Buyer in this example. The simulated screen capture of FIG. 7 shows all offers available to the Buyer for a particular product, "Widget A". As can be seen, each offer listing also displays the privacy policies associated therewith. The Buyer now knows the privacy characteristics for each of the offers for Widget A and can pick and choose from among them, with knowledge of what they may do with the privacy information. This allows the Buyer to, for example, "override" its desire to have a high degree of privacy with respect to their privacy information in favor of obtaining a significantly better price or other more favorable terms. These other terms of sale (e.g., price) could be shown on the GUI screen or be obtainable by clicking on or hovering over a particular offer on the list; methods for displaying such additional information are well-known and are left out of the example of FIG. 7 for simplicity.

Offer 13 of FIG. 7 illustrates an example of aggregation in accordance with the present invention. Offer 13 is a collaborative group comprising Seller 01 (FIG. 4) and Seller 02 (FIG. 5). In this example, Seller 01 and Seller 02 have decided to offer Widget A at a lower price to consumers than either one of them would offer individually, and in exchange for the lower price, they will have the ability to sell the email address of and send advertising to buyers who opt for the lower priced products. As noted above, Seller 01 answered "No" to all three questions regarding sale of email addresses, sending of advertising, and sharing of demographic data, i.e., Seller 01 would be considered very protective of the privacy information of participants. Seller 02, on the other hand, answered "Yes" to questions regarding sale of email addresses and sending of advertising, but "No" to the question regarding sharing of demographic data. Seller 02, therefore, is less protective of privacy than is Seller 01.

The E-marketplace analyzes Seller 01 and Seller 02 as a collaborative group, and when it aggregates their privacy characteristics, the result is an offer (Offer 13) in which Widget A is sold at a reduced cost, and with a privacy use policy that allows the sale of email addresses, allows the sending of advertising, but does not allow the sharing of demographic data. As can be seen in FIG. 7, the aggregate privacy characteristics of the Seller 01/Seller 02 combination are listed.

FIG. 8 illustrates a filtering function applied to the aggregate characteristics obtained in accordance with the present invention. In this example, the buyer is shown only those offers that match the Buyers desired privacy preferences. Shown are Offer 01 of FIG. 4, as well as others (Offer 04, Offer 08, Offer 10, and Offer 11) that have responses that indicate that they meet the buyer's preferences (the individual response pages for each are not shown, for purposes of brevity). As can be seen, the list displays only offers that meet the Buyer's preferences. Offer 01 (of FIG. 4) is shown as meeting the buyers' preferences, since Offer 01's aggregate privacy policy is within the parameters defined by the category in which the Buyer falls. Offer 02 is not shown, since it indicated that at least one of the participants would sell email addresses (see FIG. 5), contrary to the category corresponding to the preferences of the buyer. Other offers that meet the buyer's preferences are shown in FIG. 8 as well.

If desired, the aggregate policies can be grouped according to various privacy levels that characterize levels of privacy. Definitions can be given for "high", "medium", and "low" privacy levels. Market participants, including the aggregated policies of collaborative groups, with privacy characteristics that meet these definitions are assigned to one or more of the privacy levels, and then, rather than being restricted by their own privacy preferences, a market participant can choose to select a level at which they wish to participate, and will be shown only market transactions that have been identified with the selected privacy level. This gives participants the ability to view different market transactions based on aggregate characteristics and browse those that fit within their desired characteristics.

If desired, certain portions of the marketplace can be categorized separately (e.g., sellers of goods can be categorized one way while service providers could be categorized another way, etc.). This could also be applied to groups of buyers that aggregate their privacy preferences to use as a selection criteria for a market transaction. Numerous other variations will be apparent from the description and claims herein.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as in the permanent storage of a workstation or server maintained by the E-Marketplace. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of conducting electronic commerce transactions among participants in an E-marketplace, comprising the steps of:
   obtaining privacy-use information for each participant;
   identifying collaborative groups of two or more participants who are presenting a collaborative transaction to the E-marketplace;
   creating an aggregate privacy policy for each collaborative transaction, based on privacy-use information from each participant in each collaborative group; and
   presenting to the E-marketplace the aggregate privacy policy for each collaborative transaction.

2. The method of claim 1, wherein said privacy information comprises a P3P policy.

3. The method of claim 1, wherein said step of obtaining privacy-use information for each participant comprises at least the steps of:
   requesting each participant to submit said privacy-use information to the E-marketplace as part of a registration procedure for the E-marketplace; and
   storing all of said submitted privacy-use information by the E-marketplace.

4. The method of claim 1, wherein said step of obtaining privacy-use information for each participant comprises at least the steps of:
   requiring each participant to submit said privacy-use information to the E-marketplace as part of a registration procedure for the E-marketplace; and
   storing all of said submitted privacy-use information by the E-marketplace.

5. The method of claim 4, wherein said step of sharing the privacy-use information comprises at least the step of:
   said E-marketplace making available all of said stored privacy-use information to all participants upon request.

6. The method of claim 4, wherein said step of sharing the privacy-use information comprises at least the step of:
   said E-marketplace making available to participants in a particular transaction the stored privacy-use information of all participants in said particular transaction.

7. The method of claim 1, further comprising the step of:
   creating an individual privacy policy for each non-collaborative transaction, based on privacy-use information from the individual participant in said non-collaborative transaction; and
   presenting to the E-marketplace the individual privacy policy for each non-collaborative transactions.

8. The method of claim 7, further comprising the steps of:
   displaying to a particular participant only information pertaining to transactions that have privacy policies corresponding to their privacy-use information.

9. A computer program product recorded on computer readable medium for conducting electronic commerce transactions among participants in an E-marketplace, comprising:
   computer-readable means for obtaining privacy-use information for each participant;
   computer-readable means for identifying collaborative groups of two or more participants who are presenting a collaborative transaction to the E-marketplace;
   computer-readable means for creating an aggregate privacy policy for each collaborative transaction, based on privacy-use information from each participant in each collaborative group; and
   computer-readable means for presenting to the E-marketplace the aggregate privacy policy for each collaborative transaction.

10. The program product of claim 9, wherein said privacy information comprises a P3P policy.

11. The program product of claim 9, wherein said computer-readable means for obtaining privacy-use information for each participant comprises:
    computer-readable means for requesting each participant to submit said privacy-use information to the E-marketplace as part of a registration procedure for the E-marketplace; and
    computer-readable means for storing all of said submitted privacy-use information by the E-marketplace.

12. The program product of claim 9, wherein said computer-readable means for obtaining privacy-use information for each participant comprises:
    computer-readable means for requiring each participant to submit said privacy-use information to the E-marketplace as part of a registration procedure for the E-marketplace; and
    computer-readable means for storing all of said submitted privacy-use information by the E-marketplace.

13. The program product of claim 12, wherein said computer-readable means for sharing the privacy-use information comprises:
    computer-readable means for making available via said E-marketplace all of said stored privacy-use information to all participants upon request.

14. The program product of claim 12, wherein said computer-readable means for sharing the privacy-use information comprises:
    computer-readable means for making available to participants in a particular transaction, via said E-marketplace, the stored privacy-use information of all participants in said particular transaction.

15. The program product of claim 9, further comprising:
    computer-readable means for creating an individual privacy policy for each non-collaborative transaction, based on privacy-use information from the individual participant in said non-collaborative transaction; and
    computer-readable means for presenting to the E-marketplace the individual privacy policy for each non-collaborative transactions.

16. The program product of claim 15, further comprising:
    computer-readable means for displaying to a particular participant only information pertaining to transactions that have privacy policies corresponding to their privacy-use information.

* * * * *